(12) United States Patent
Wei

(10) Patent No.: US 10,761,243 B1
(45) Date of Patent: Sep. 1, 2020

(54) OPTICAL DEVICE

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/550,608

(22) Filed: Aug. 26, 2019

(51) Int. Cl.
| | |
|---|---|
| *G02B 3/00* | (2006.01) |
| *F21S 41/265* | (2018.01) |
| *F21S 41/26* | (2018.01) |
| *F21S 41/275* | (2018.01) |
| *G02B 3/02* | (2006.01) |
| *F21S 43/20* | (2018.01) |
| *F21S 41/27* | (2018.01) |
| *F21W 103/20* | (2018.01) |
| *F21S 41/29* | (2018.01) |
| *F21S 43/27* | (2018.01) |

(52) U.S. Cl.
CPC .............. *G02B 3/005* (2013.01); *F21S 41/26* (2018.01); *F21S 41/265* (2018.01); *F21S 41/275* (2018.01); *F21S 43/26* (2018.01); *G02B 3/02* (2013.01); *F21S 41/295* (2018.01); *F21S 43/27* (2018.01); *F21W 2103/20* (2018.01); *G02B 2003/0093* (2013.01)

(58) Field of Classification Search
CPC .................. G02B 3/0043; G02B 3/005; G02B 6/0075–0078; F21Y 2103/10; F21Y 2107/50; F21Y 2113/00; F21Y 2113/20; F21S 41/25; F21S 41/265; F21S 43/235; F21S 43/243; F21S 43/249; F21V 5/007
See application file for complete search history.

(56) References Cited

U.S. PATENT DOCUMENTS

| | | | |
|---|---|---|---|
| 10,253,940 B1* | 4/2019 | Shih ...................... F21S 41/143 |
| 2003/0011888 A1* | 1/2003 | Cox .................... G02B 6/12002 |
| | | | 359/626 |
| 2003/0206342 A1* | 11/2003 | Reed ..................... G02B 3/0031 |
| | | | 359/460 |
| 2004/0012976 A1* | 1/2004 | Amano ................. F21V 7/0091 |
| | | | 362/511 |
| 2005/0270791 A1* | 12/2005 | Lee ....................... F21S 41/143 |
| | | | 362/517 |
| 2007/0019429 A1* | 1/2007 | Gasquet .................. F21V 5/045 |
| | | | 362/510 |
| 2014/0339440 A1* | 11/2014 | Schadt ............... G02B 19/0066 |
| | | | 250/492.1 |
| 2016/0033089 A1* | 2/2016 | Wang ..................... F21V 7/005 |
| | | | 362/244 |
| 2017/0314764 A1* | 11/2017 | Kishikawa .............. F21V 5/007 |
| 2018/0245760 A1* | 8/2018 | Kanayama .............. F21S 41/24 |

* cited by examiner

*Primary Examiner* — Alexander K Garlen
(74) *Attorney, Agent, or Firm* — Muncy, Geissler, Olds & Lowe, P.C.

(57) ABSTRACT

An optical device is provided, including: a plurality of lens units, each of the plurality of lens units including a light incident side and a light exiting side, each light emitting side including a microstructured surface, and at least two of the microstructured surfaces of the plurality of lens units are arranged in a high and low configuration.

10 Claims, 6 Drawing Sheets

OPTICAL DEVICE

BACKGROUND OF THE INVENTION

Field of the Invention

The present invention relates to an optical device.

Description of the Prior Art

In a conventional lamp such as vehicle lamp, a lens has a single light incident surface and only one light exiting surface. A single light source is used to project light into the light incident surface, refracted and scattered by the surface microstructure, and then emits out.

However, the conventional lamp cover of the lamp has a non-flat curved surface, and the light exiting surface of the conventional lens is flat, so there are different distances between respective different portions of the light exiting surface and the inner surface of the lamp cover, thus resulting in, at different portions of the lens, uneven light collecting effect, partly low light intensity, and monotonous stereoscopic vision to eyes due to the single light source, the single light incident surface and the single light emitting surface.

The present invention is, therefore, arisen to obviate or at least mitigate the above-mentioned disadvantages.

SUMMARY OF THE INVENTION

The main object of the present invention is to provide an optical device which can provide good effects of light-collection and aesthetic vision to eyes To achieve the above and other objects, the present invention provides an optical device, including: a plurality of lens units, each of the plurality of lens units including a light incident side and a light exiting side, each said light exiting side including a microstructured surface, at least two of the microstructured surfaces of the plurality of lens units being arranged in a high and low configuration.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
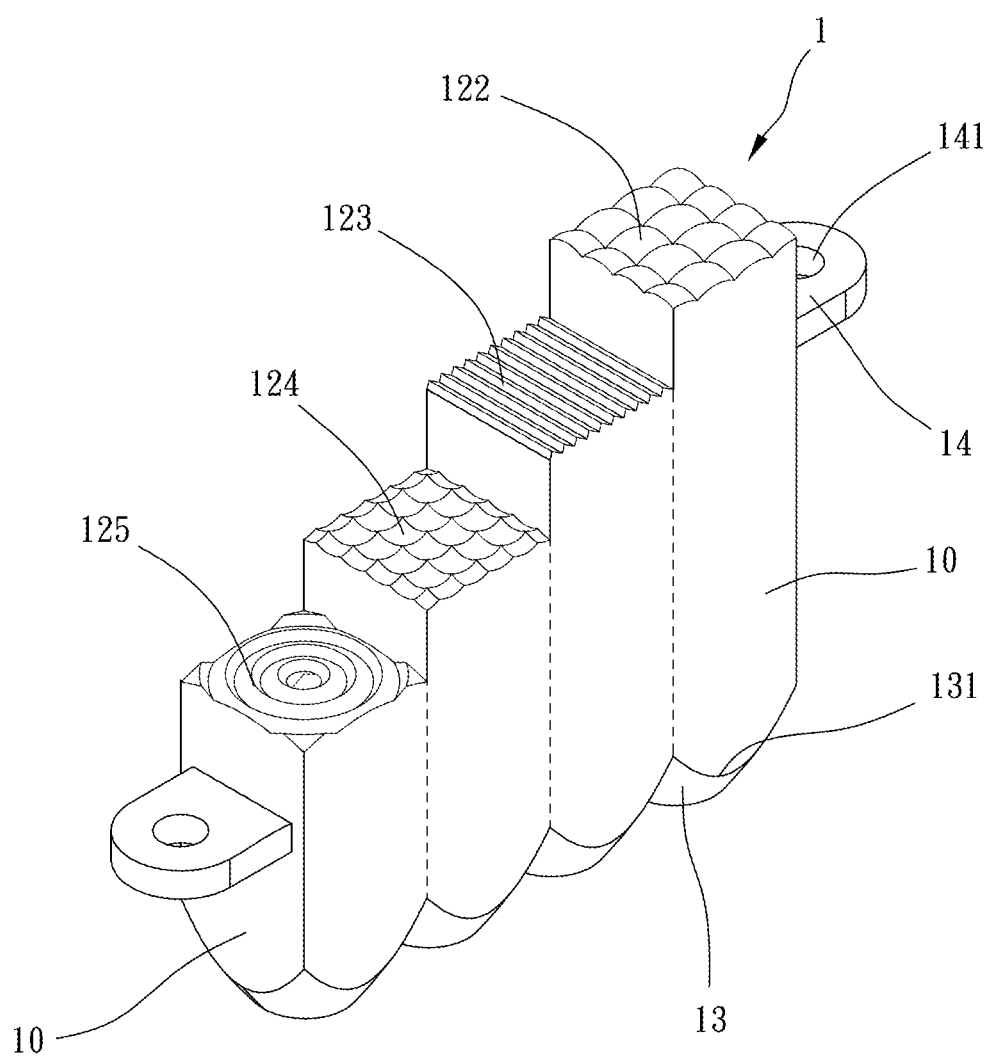
FIG. 1 is a stereogram of a preferable embodiment of the present invention.
Figure 2:
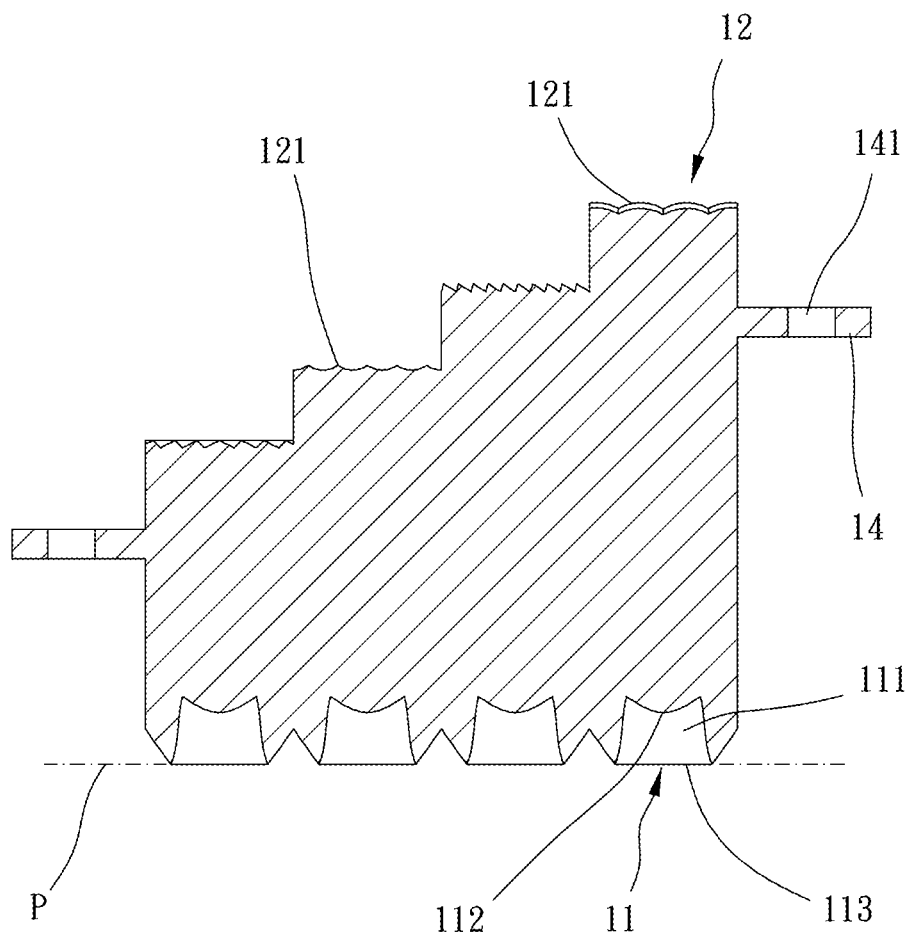
FIG. 2 is a cross-sectional view of a preferable embodiment of the present invention.
Figure 3:
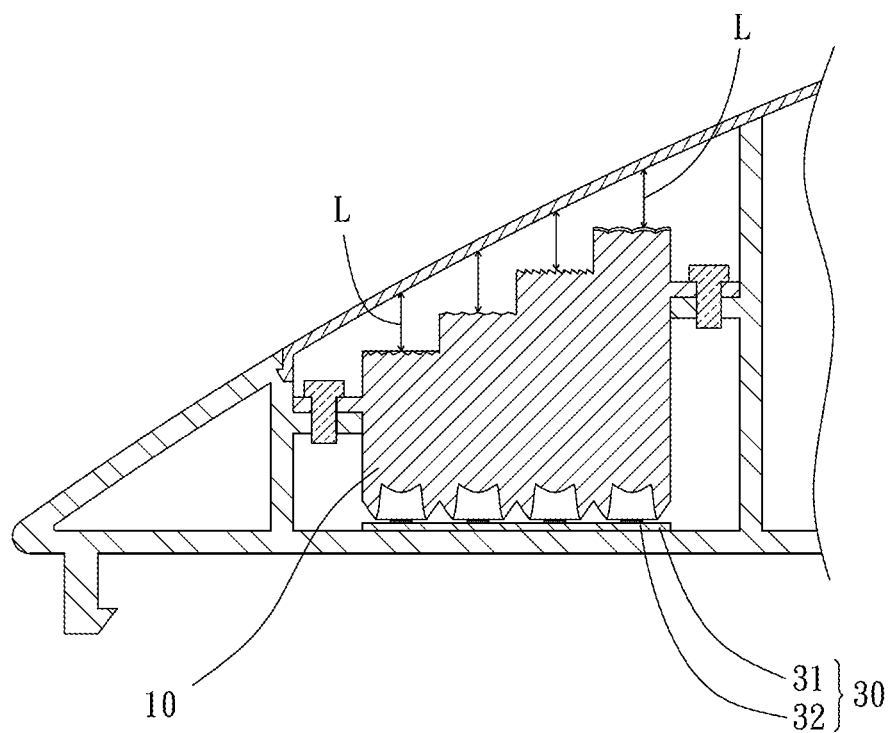
FIG. 3 is a drawing showing an application of a preferable embodiment of the present invention.

Please refer to FIGS. 1 to 3 for a preferable embodiment of the present invention. An optical device 1 of the present invention includes a plurality of lens units 10, each of the plurality of lens units 10 includes a light incident side 11 and a light exiting side 12, each said light exiting side 12 includes a microstructured surface 121, and at least two of the microstructured surfaces 121 of the plurality of lens units 10 are arranged in a high and low configuration. Preferably, all of the microstructured surface 121s of the plurality of lens units 10 are arranged in a high and low configuration. Whereby, the plurality of lens units 10 provides good effects of light-collection and aesthetic vision to eyes.

Preferably, at least two of the light incident sides 11 of the plurality of lens units 10 are located on a same plane P, and at least two of the plurality of lens units 10 have different lengths. In this embodiment, the plurality of lens units 10 are integrally formed of one piece, thus being easy to manufacture and of low cost; all of the light incident sides 11 of the plurality of lens units 10 are located on the same plane P; all of the lens units 10 have different lengths (perpendicular to the plane P), all of the microstructured surfaces 121 of the plurality of lens units 10 are arranged in a high and low configuration, and every neighboring two of the microstructured surfaces 121 of the plurality of lens units 10 have a same height difference therebetween, wherein each of the microstructured surfaces 121 of the plurality of lens units 10 can be distanced from a housing 20 (such a turn light housing or head lamp housing of a vehicle, or a housing of the like) with the same distance L according the shape profile of the housing 20, and it can provide much diversity of light and good aesthetic vision to eyes, in cooperation with the microstructured surfaces 121 arranged in a high and low configuration.

Each said light incident side 11 includes a cavity 111 including a convex 112 disposed thereinside. Each of the plurality of lens units 10 has a fixed cross-section between the cavity 111 and the microstructured surface 121 (shapes or sizes of the fixed cross-sections of the plurality of lens units 10 may be the same or different), and thus the light beam concentrated by the convex 112 and passing the lens units 10 can provide lateral visible aesthetic light display. Each of the plurality of lens units 10 further includes a tapered circumferential wall 13 which is disposed around the cavity 111 and has a top edge 131 which is nearer an opening 113 of the cavity 111 than the convex 112. The tapered circumferential wall 13 can reflex and guide the light toward the light exiting side 12, which has good light evenness and high energy efficiency. The optical device 1 further includes at least one attachment member 14 projecting from the at least one the lens units 10. Preferably, the optical device 1 includes a plurality of the attachment members 14, and each said attachment member 14 includes an attachment hole 141, which is easy to be assembled (for example, be screwed) to a lamp assembly or a vehicle body.

The microstructured surfaces 121 of the plurality of lens units 10 includes at least one of a convex microstructure 122, toothed microstructure 123, concave microstructure 124 and annular projecting microstructure 125. The microstructured surfaces 121 of the plurality of lens units 10 may be all the same, partly the same or all different, to provide consistent, different or alternative lighting display effects.

Figure 4:
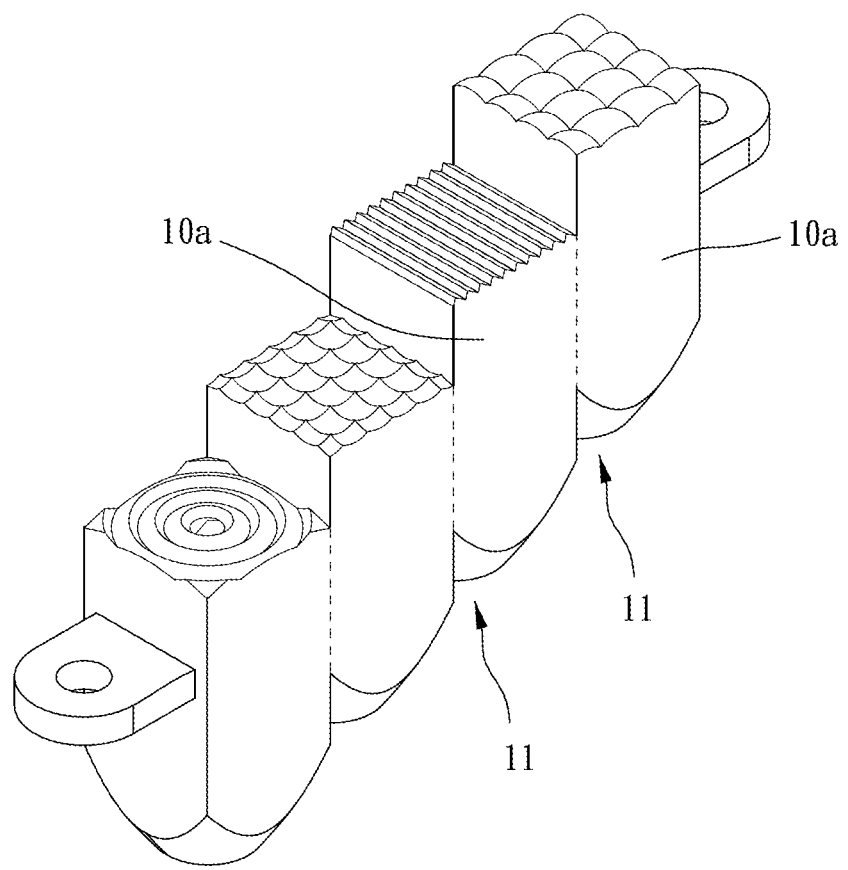
FIG. 4 is a stereogram of another preferable embodiment of the present invention.
Figure 5:
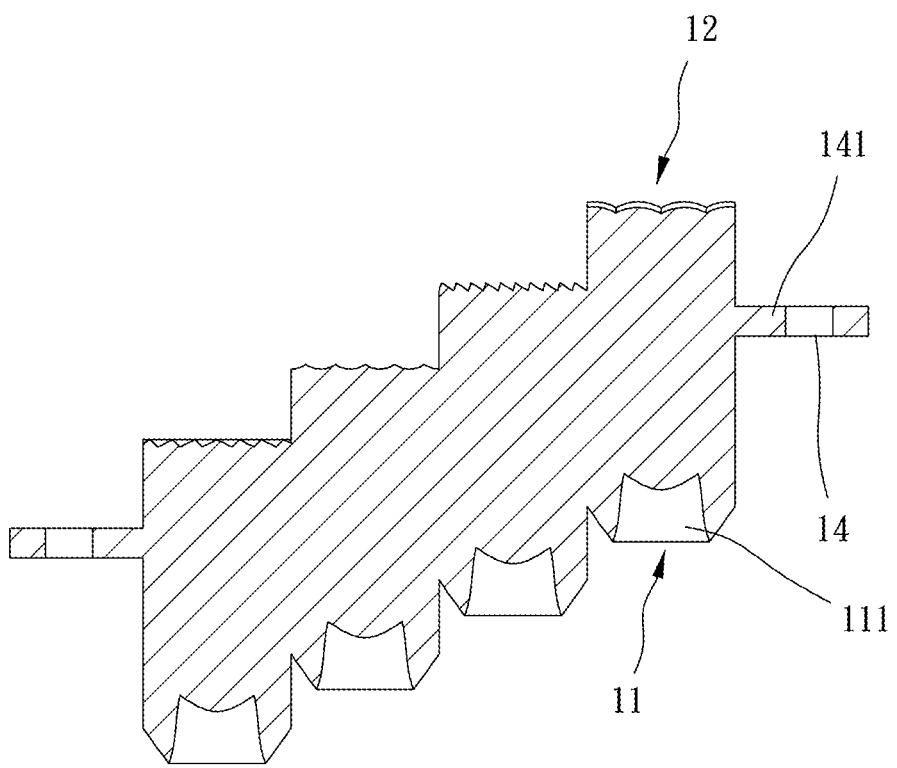
FIG. 5 is a cross-sectional view of the another preferable embodiment of the present invention.
Figure 6:
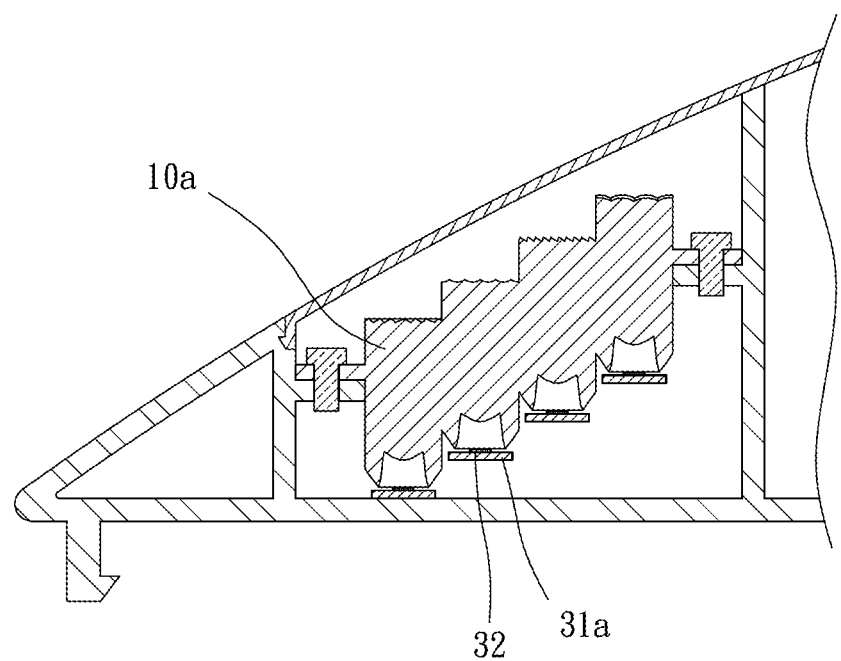
FIG. 6 is a drawing showing an application of the another preferable embodiment of the present invention.

In other embodiment, at least two of the light incident sides 11 of the plurality of lens units 10a may be arranged in a high and low configuration, and at least two of the plurality of lens units 10a has a same length. As shown in FIGS. 4-6, all of the light incident sides 11 of the plurality of lens units 10a are arranged in a high and low configuration, which facilitates formation of the optical device by injection molding.

The optical device 1 may further includes a plurality of light-emitting units 30, each of the plurality of light-emitting units 30 includes a circuit unit 31 which corresponds to one of the light incident side 11 and a light-emitting member 32 which is disposed on the circuit unit 31 and faces one of the light incident side 11. In the structure shown in FIGS. 1-3, all of the light incident sides 11 of the plurality of lens units 10 are located on the same plane P, and thus only one circuit board including a plurality of light-emitting members 32 and a plurality of circuit units 31 is needed; In the structure shown in FIGS. 4-6, all of the light incident sides 11 of the plurality of lens units 10a are arranged in a high and low configuration, and the light incident sides 11 of the lens units 10a each correspond to a circuit unit 31a including at least one the light-emitting member 32. In the aforementioned structures, the plurality of light-emitting member 32 may light synchronously or asynchronously, of same or different lighting colors, which can provide diverse lighting modes.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical device, including:
   a plurality of lens units, each of the plurality of lens units including a light incident side and a light exiting side, each said light exiting side including a microstructured surface, each of the plurality of lens units has a fixed cross-section from the light incident side to the light exiting side including the microstructured surface, at least two of the microstructured surfaces of the plurality of lens units being arranged in a high and low configuration,
   wherein the optical device further includes at least one attachment member projecting from at least one of the lens units, and the plurality of lens units and the at least one attachment member are integrally formed of one piece;
   wherein the plurality of lens units are integrally and solidly connected laterally in series in a direction parallel to each said light exiting side, and each said light exiting side of one of the plurality of lens units integrally connected to a side of another one of the plurality of lens units.

2. The optical device of claim 1, wherein at least two of the light incident sides of the plurality of lens units are located on a same plane.

3. The optical device of claim 1, wherein at least two of the light incident sides of the plurality of lens units are arranged in a high and low configuration.

4. The optical device of claim 1, wherein at least two of the plurality of lens units have different lengths.

5. The optical device of claim 1, wherein at least two of the plurality of lens units have same lengths.

6. The optical device of claim 1, wherein each said light incident side includes a cavity including a convex disposed thereinside.

7. The optical device of claim 6, wherein each of the plurality of lens units further includes a tapered circumferential wall which is disposed around the cavity and has a top edge which is nearer an opening of the cavity than the convex is.

8. The optical device of claim 7, wherein all of the light incident sides of the plurality of lens units are located on a same plane; all of the microstructured surfaces of the plurality of lens units are arranged in a high and low configuration; each of the plurality of lens units has a length different from one another; each of the plurality of lens units has the fixed cross-section between the cavity and the microstructured surface; every neighboring two of the microstructured surfaces of the plurality of lens units have a same height difference therebetween; the fixed cross-sections of the plurality of lens units are the same; each said attachment member includes an attachment hole.

9. The optical device of claim 1, wherein the microstructured surfaces of the plurality of lens units include at least one of a convex microstructure, a toothed microstructure, a concave microstructure and an annular projecting microstructure.

10. The optical device of claim 1, further including a plurality of light-emitting units, wherein each of the plurality of light-emitting units includes a circuit unit which corresponds to one of the light incident side and a light-emitting member which is disposed on the circuit unit and faces one of the light incident side.

* * * * *